United States Patent
Gassman et al.

(10) Patent No.: US 7,005,847 B2
(45) Date of Patent: Feb. 28, 2006

(54) POSITION SENSOR USING A COMPOUND MAGNETIC FLUX SOURCE

(75) Inventors: George Wayne Gassman, Marion, IA (US); Carl Gene Scafferi, Marshalltown, IA (US); Ronald Francis Hurd, Marshalltown, IA (US)

(73) Assignee: Fisher Controls International LLC, St. Louis, MI (US)

( * ) Notice: Subject to any disclaimer, the term of this patent is extended or adjusted under 35 U.S.C. 154(b) by 0 days.

(21) Appl. No.: 11/153,937

(22) Filed: Jun. 16, 2005

(65) Prior Publication Data

US 2006/0012362 A1    Jan. 19, 2006

Related U.S. Application Data

(62) Division of application No. 10/189,945, filed on Jul. 3, 2002, now Pat. No. 6,909,281.

(51) Int. Cl.
   *G01B 7/30*    (2006.01)
(52) U.S. Cl. ............................ 324/207.25; 324/207.24; 324/207.15
(58) Field of Classification Search .......... 324/207.24, 324/207.15, 251, 174, 225, 207.21, 207.26, 324/207.2, 235, 228, 262, 207.25, 207.22; 338/32 H, 32 R
See application file for complete search history.

(56) References Cited

U.S. PATENT DOCUMENTS 5,670,875 A * 9/1997 Alfors et al. ............... 324/202

* cited by examiner

*Primary Examiner*—Bot Ledynh
*Assistant Examiner*—Reena Aurora
(74) *Attorney, Agent, or Firm*—Marshall, Gerstein & Borun LLP

(57) ABSTRACT

A non-contacting position sensor detects relative displacement between two objects. A magnetic flux source is provided by a plurality of discrete magnets selectively determined to produce a highly configurable flux source that is easily adapted to rotary or rectilinear displacement. The interaction of the individual flux fields generated by the discrete magnets is controlled to produce both linear and non-linear relationships with respect to changes in displacement. A flux-gathering pole piece is dimensionally optimized to integrate the plurality of individual flux fields directed to a magnetic sensor.

4 Claims, 10 Drawing Sheets

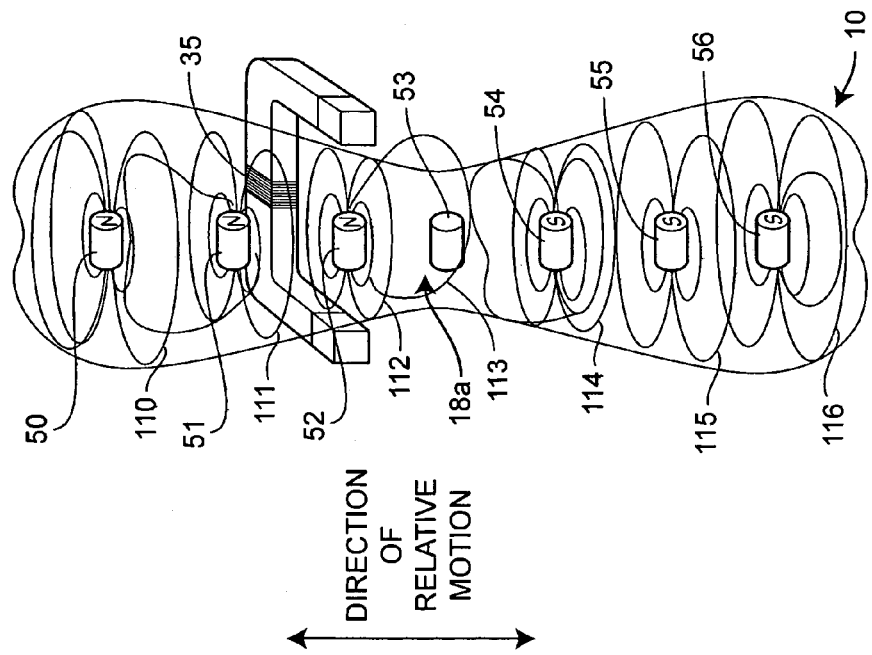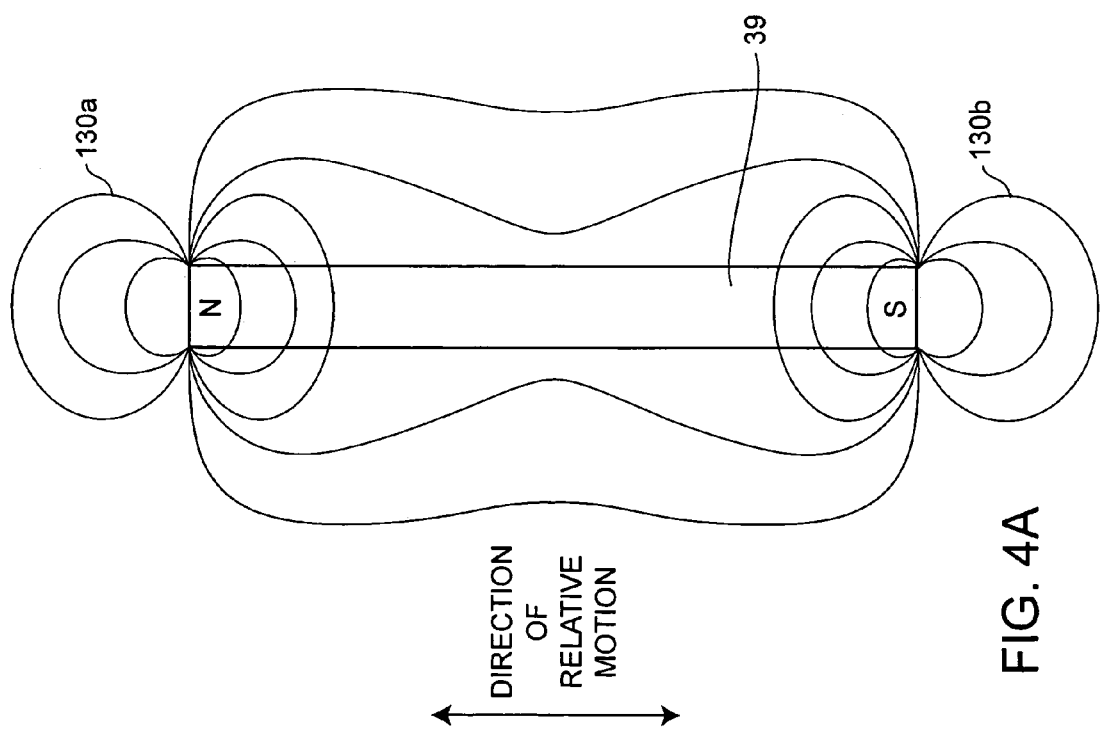

POSITION SENSOR USING A COMPOUND MAGNETIC FLUX SOURCE

CROSS-REFERENCE TO RELATED U.S. PATENT(S) AND U.S. APPLICATION(S)

This application is a divisional of U.S. patent application Ser. No. 10/189,945, filed Jul. 3, 2002 now U.S. Pat. No. 6,909,281. The subject matter of this disclosure is also related to U.S. Pat. No. 5,451,923, filed on Sep. 18, 1995, entitled "Communication System and Method", U.S. Pat. No. 6,060,881, filed Aug. 6, 1997, entitled "Flux Shaping Pole Pieces for a Magnetic Displacement Sensor," and U.S. application Ser. No. 09/836,307 filed on Apr. 17, 2001 (now issued as U.S. Pat. No. 6,382,226) entitled "Method for Detecting Broken Valve Stem", which are assigned to the same assignee as the present patent application, and are hereby incorporated by reference.

FIELD OF TECHNOLOGY

This application relates to an apparatus for measuring displacement or position between two objects. More specifically, a non-contacting position sensor is disclosed having a configurable magnetic flux source that is used to detect valve stem position on a control valve.

BACKGROUND

Industrial processing plants use control valves in a wide variety of applications from controlling product flow in a food processing plant to maintaining fluid levels in large tank farms. Control valves, which are typically automated, are used to manage the product flow by functioning like a variable orifice or passage. By moving an internal valve component, the valve plug, the amount of product passing through valve body can be accurately controlled. The control valve is typically automated using an actuator and a remotely operated instrument which communicates between a process control computer and the actuator to command flow changes within the valve to achieve the plant operators' desired control strategy. Position sensors play a critical role in maintaining accurate process control.

When the process control computer issues a command to modify flow, the remotely operated instrument must read the present valve position and apply appropriate corrective action through the actuator. A typical actuator is driven by a pressurized air source, which is controlled by the remotely operated instrument. For example, in a spring and diaphragm actuator used on a sliding stem valve, variations in air pressure applied to a large diaphragm cause movement or displacement of the diaphragm. Attached to the diaphragm is an actuator stem, which in turn is connected to the valve plug. By changing air pressure to the diaphragm, the remotely operate instrument can directly position the valve plug and therefore control flow through the control valve. In order to properly control flow, the instrument must always know where the valve plug is and where it must move to in response to the new command. This is accomplished by attaching a position sensor between the remotely operated instrument and the actuator stem. The output of the position sensor may be directly connected to the remotely operated instrument to provide stem position feedback for precise valve control.

Traditional position sensors, such as potentiometers, require dynamic or moving mechanical linkages to couple movement or displacement into the sensor. In applications where mechanical vibrations caused by turbulent flow exist, system errors or instabilities can reduce the position sensor's reliability by causing millions of operational cycles to accumulate in a very brief time period. The mechanical linkages also have contact or wear points. During rugged service conditions, instabilities can literally "saw apart" the mechanical linkages at the wear points thereby disconnecting the valve stem from the remotely operated instrument. Catastrophic failures of this type destroy valve control and must be avoided. To improve sensor reliability, sensor designs have migrated to non-contacting position detection methods.

One type of non-contacting sensor design is a magnetic position sensor. Magnetic position sensors detect displacement between two objects by attaching a magnetic flux source, typically a magnet, to the first object and a sensor, such as a Hall Effect sensor to the second object. The magnetic flux source presents a magnetic field that is detected by the sensor. Any movement by one or both objects producing relative displacement presents a different portion of the magnetic field to the sensor, thereby changing the output of the sensor. This output can be directly related to the relative displacement between the actuator and the valve stem.

Non-contact position sensors are very adaptable and can measure numerous forms of displacement. However, current non-contacting position sensors are often limited by the method of attaching them to the moving elements. There are numerous commercial examples of position or feedback sensor in remotely operated instruments that still use "contacting" dynamic linkages to couple displacement. One such configuration uses a conventional worm-gear apparatus to directly couple rotary motion to a non-contacting magneto-resistive element. Although the magneto-resistive element can be classified as a non-contacting sensor, the motion is actually transduced through a "contacting" apparatus and will suffer from decreased reliability just like traditional linkage-based potentiometers.

Additionally, other non-contact position sensors suffer from the inability to reconfigure the magnet flux source to provide a predefined output for various types of displacement measurement (e.g. rectilinear and rotary). Examples of these types of position sensors are found in Riggs et al. U.S. Pat. No. 5,359,288, Wolf et al. U.S. Pat. No. 5,497,081, and Takaishi et al. U.S. Pat. No. 5,570,015.

SUMMARY

A position sensor assembly as described herein provides a non-contact position for accurately detecting the relative displacement between two objects and more specifically to precisely measure the position of a valve plug in a control valve assembly.

In one embodiment, a position sensor with a highly configurable magnetic flux source using a plurality of discrete magnets that is adapted to measure both rectilinear displacement or rotary displacement. This is accomplished through controlled design of a magnetic assembly. Individual magnets are assembled to create a continuous compound flux field thereby creating a variable physical geometry magnetic flux source.

In another embodiment, programming the magnetic assembly predetermines the relationship between travel and the position sensor output. Numerous output relationships are designed by predefining the magnetic field then programming the plurality of discrete magnets to cooperatively create the desired magnetic field.

Another embodiment uses a cylindrical magnet to create a rotary position sensor with highly linear output characteristics through an extended range of rotation. By accurately controlling the length of the cylindrical magnet and the air gap within the sensor assembly, the response characteristics are greatly improved.

BRIEF DESCRIPTION OF THE DRAWINGS

The features and advantages of the position sensor described herein will be best appreciated upon reference to the following detailed description and the accompanying drawings, in which:

FIG. 4A is a free space diagram used to illustrate the nonlinear end effects of a single bar magnet placed as described in prior art and used as a magnetic flux source for rectilinear displacement measurement.

FIG. 4B is a free space diagram used to illustrate the overlapping flux fields generated by the discrete magnets of the discretized magnetic flux source and the resulting compound magnetic field gathered by the flux-gathering pole piece.

DETAILED DESCRIPTION OF THE PREFERRED EMBODIMENTS

To appreciate the advantages of the position sensor described herein, it is desirable to have an understanding of a position sensor's components and how they operate to measure displacement on a control valve. Although the preferred embodiment teaches displacement measurement related to control valves, those skilled in the art will recognize the relevance to other displacement measurement applications as well. Turning to the drawings and referring initially to FIG. 1A, the key components of the non-contact position sensor are shown.

Figure 1A:
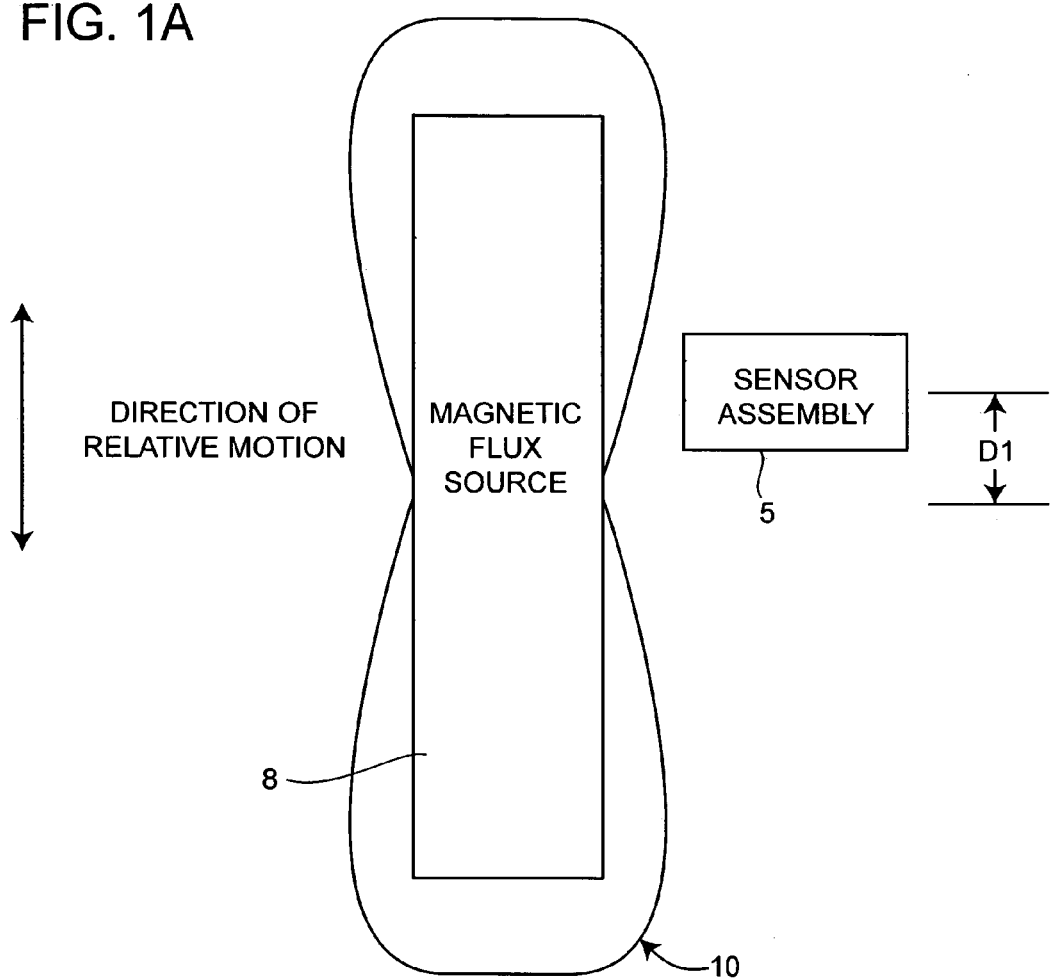
FIG. 1A shows a block diagram illustrating a cross-sectional view of a magnetic sensor positioned near the center of a magnetic flux source.
Figure 1C:
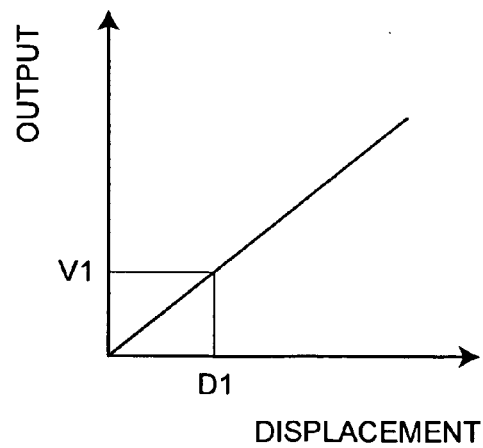
FIG. 1C is a graph illustrating the magnetic sensor output corresponding to FIG. 1A.

In FIG. 1A, the sensor 5 is placed adjacent to the magnetic flux source 8. As commonly known, the magnetic flux source 8 presents a continuous, three-dimensional flux field that completely envelopes both the magnetic flux source 8 and the sensor 5. Continuing, the sensor 5 is a device that produces an electrical signal that is proportional to the magnetic field 10 that surrounds it. As known to those skilled in the art, the detected magnitude of the magnetic field 10 changes with respect to position within the magnetic field 10. Consequently, any change in relative position or displacement of the sensor 5 with respect to magnetic field 10 will produce a corresponding change in the sensor's 5 output as is illustrated in the graph of FIG. 1C. This relationship can be exploited to create a non-contact position sensor.

In non-contacting position or displacement measurement applications, the sensor 5 and the magnetic flux source 8 are mounted on two mechanically independent objects (not shown). No dynamic or moving mechanical linkages are used to couple the relative displacement between the magnetic flux source 8 directly into the sensor 5. Referring again to FIG. 1A, the relative position of the sensor 5 and the magnetic flux sensor 8 places the sensor 5 near the center of the magnetic flux source 8 with a displacement indicated by D1.

Figure 1B:
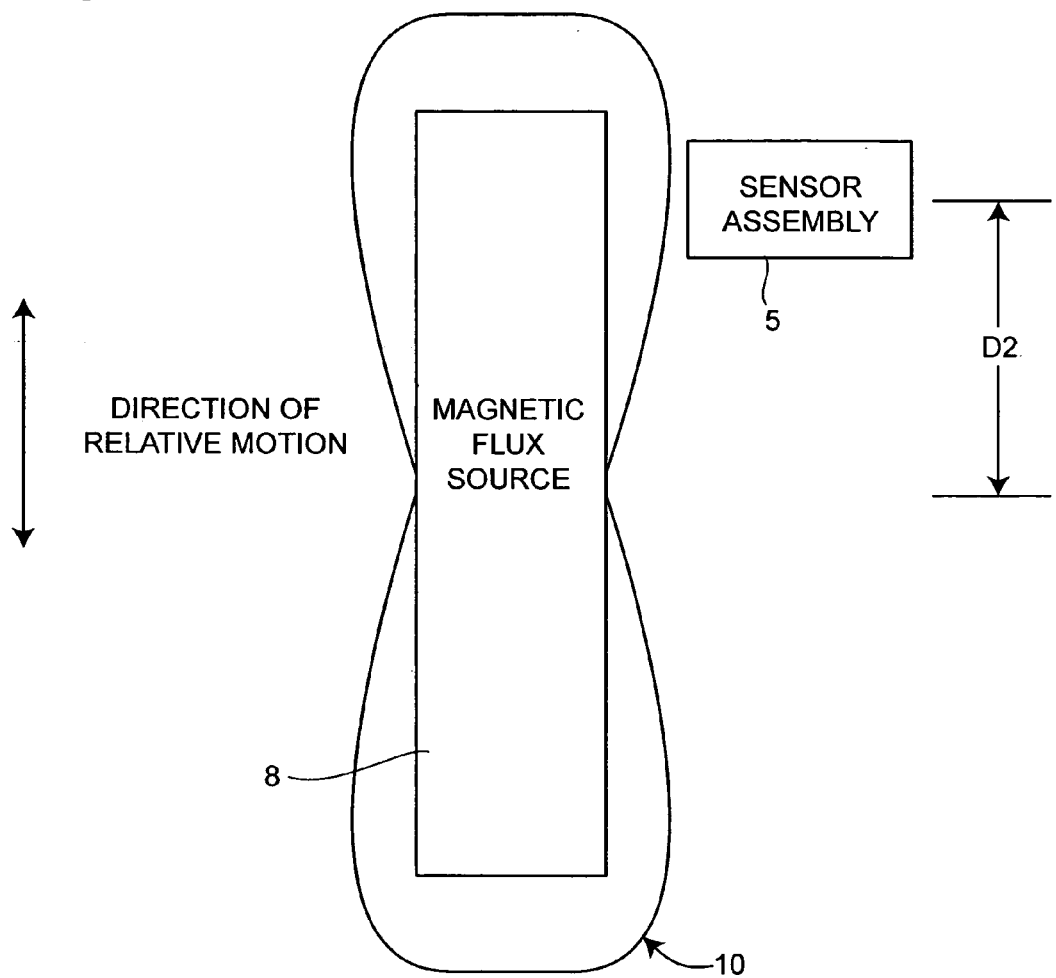
FIG. 1B shows a block diagram illustrating a cross-sectional view of the magnetic sensor of FIG. 1A positioned near one end of the magnetic flux source.
Figure 1D:
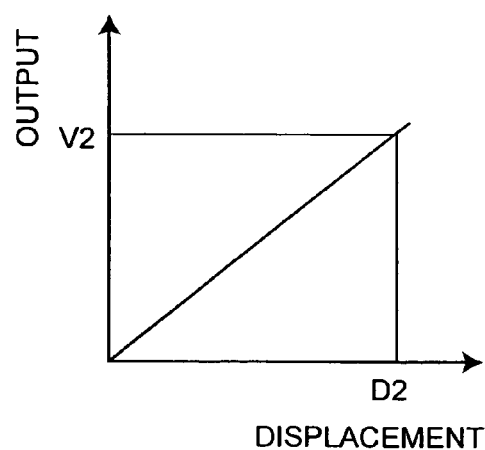
FIG. 1D is a graph illustrating the magnetic sensor output corresponding to FIG. 1B.

The corresponding graph in FIG. 1C shows the sensor 5 output indicated by V1 for a displacement of D1. In FIG. 1B, the displacement is changed to a new position, indicated by D2 placing the sensor 5 near the end of the magnetic flux source 8. The corresponding graph in FIG. 1D shows the change in the sensor 5 output directly related to the change in position of the sensor 5 within the magnetic field 10 generated by the magnetic flux source 8, V2. These changes in the sensor 5 output signal are used as a direct measurement of the displacement between the two mechanically independent objects. An electronic circuit (not shown) connected to the sensor 5 is used to process the output signal of the sensor 5 for use in control valve applications explained in greater detail below.

Figure 2A:
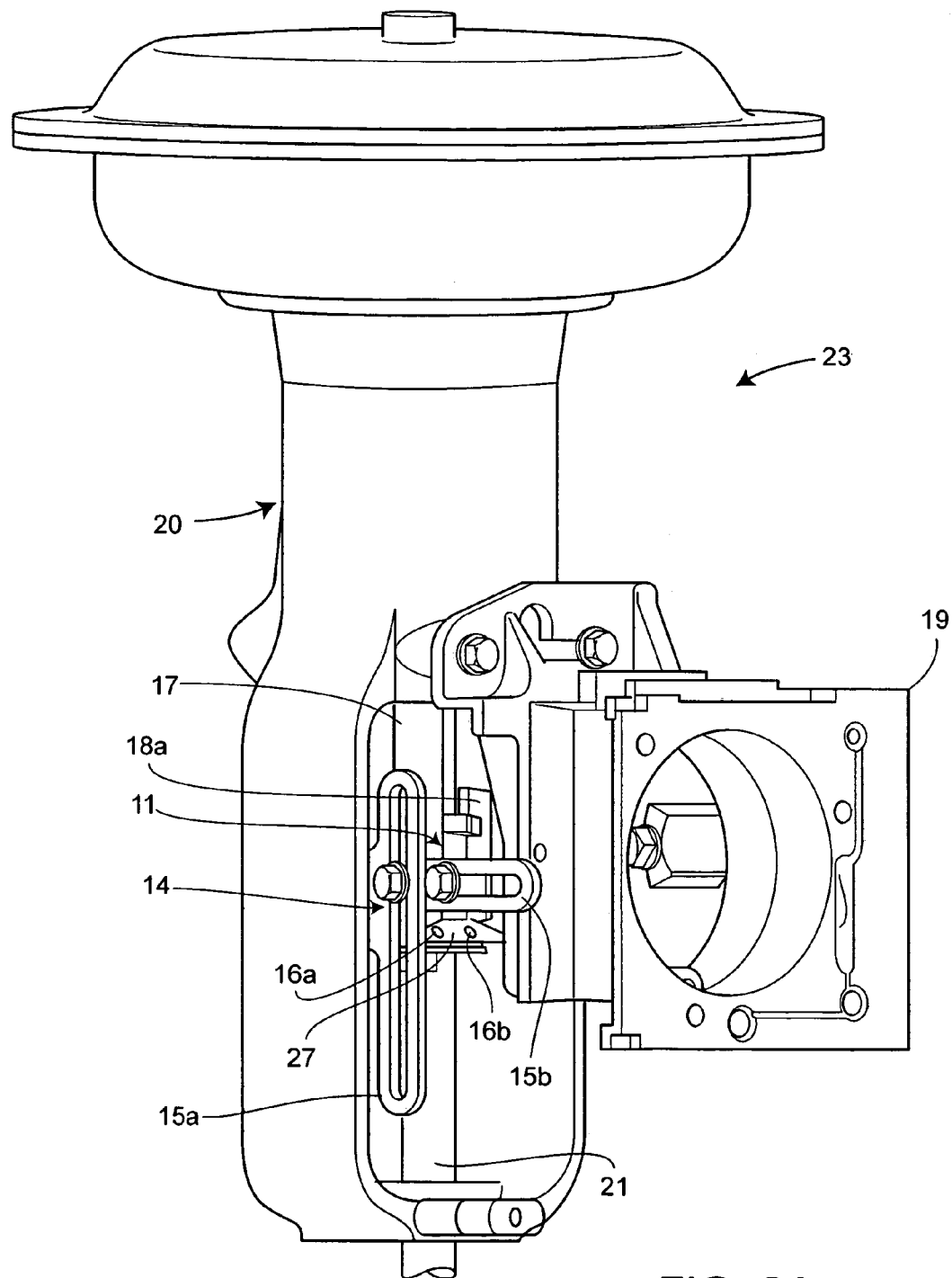
FIG. 2A is a perspective view of a non-contacting position sensor assembly mounted to a sliding stem actuator to detect rectilinear displacement of a valve stem.

Referring now to FIG. 2A, a position sensor is shown coupled to a sliding stem actuator 20 used for automated control of a control valve. The sliding stem actuator 20 is adapted for rectilinear motion (i.e. motion in a straight line). The perspective view of FIG. 2A shows how the position sensor's magnetic sensor assembly 11 and magnetic flux source 18a (shown in greater detail in FIGS. 3–7) are independently mounted between the sliding stem actuator 20 and the remotely operated instrument 19 (only the remotely mounted instruments' module base is shown).

As known, the sliding stem actuator 20, the remotely operated instrument 19, and a control valve (not shown) combine to form the valve assembly 23. A mounting assembly 14 attaches the magnetic flux source 18a to the stem connector 27. The mounting assembly 14 is constructed from a mounting plate 15a and an alignment plate 15b. The stem connector 27 is connected between the actuator stem 17 and the valve stem 21 using stem connector bolts 16a and 16b.

Figure 2B:
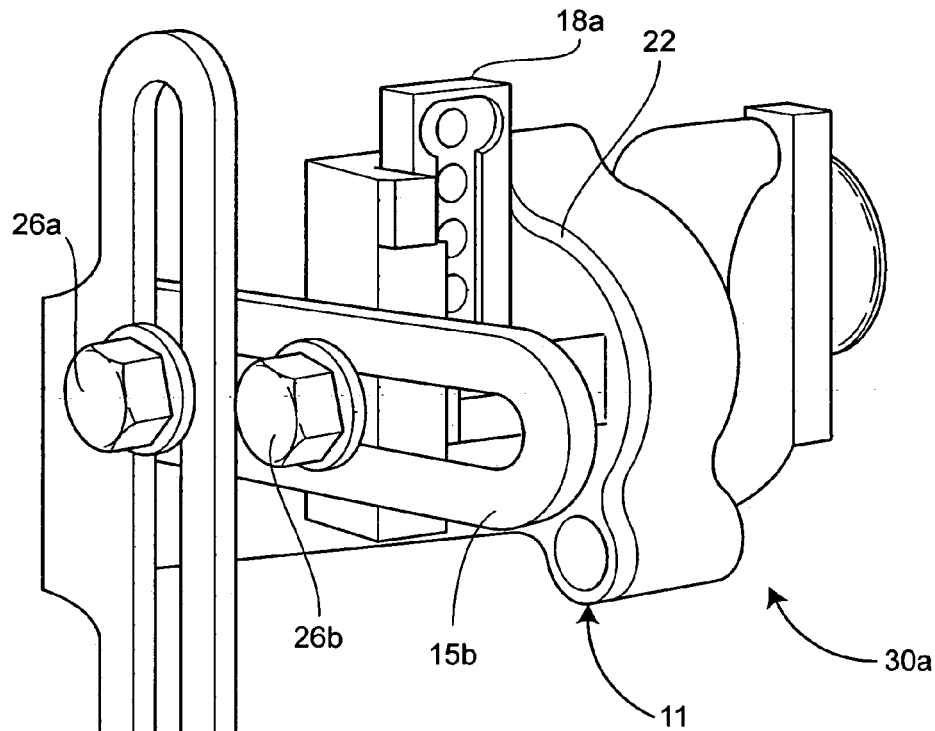
FIG. 2B is a perspective view of the complete non-contact position sensor assembly of FIG. 2A showing the interconnection between the magnetic flux source and the non-contact position sensor assembly.

The general operation of a typical valve assembly not equipped with the present position sensor is described in U.S. Pat. No. 5,451,923 and is assigned to Fisher Controls International, Inc. and hereby incorporated by reference. As is known, when a command to move the valve plug is received by the remotely operated instrument 19, pressurized air is directed to the sliding stem actuator 20 and the actuator stem 17 will move. Any displacement of the actuator stem 17 creates a relative change in position of the magnetic flux source 18a with respect to the sensor assembly 11. This position change modifies the sensor output. The output signal is transmitted to the remotely operated instrument 19 for processing to create precise control of the valve plug (not shown). FIG. 2B shows a perspective view of the rectilinear position sensor 30a. The magnetic flux source 18a and the sensor assembly 11 are placed in close proximity to adequately couple the magnetic field 10 (FIG. 1A and FIG. 1B) to the sensor assembly 11, but make no contact during operation.

Figure 2C:
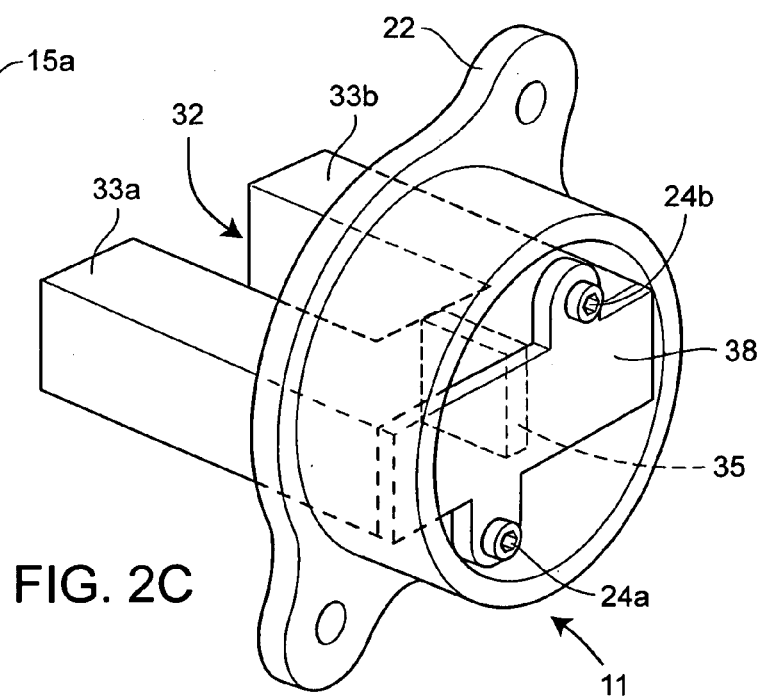
FIG. 2C is a perspective view of the sensor housing and sensor assembly for the rectilinear non-contact position sensor.

Now referring to FIG. 2C, The sensor assembly 11 is mounted in the sensor housing 22. The sensor housing 22 provides positional alignment of the flux-gathering pole piece 32 and magnetic sensor 35 (explained in greater detail below). The magnetic sensor 35 and flux-gathering pole piece 32 are held in the sensor housing 22 by a bracket 38 and two screws 24a and 24b. Furthermore, by integrating the sensor housing 22 directly into the remotely operated instrument 19, the electrical connections are simplified and compliant with industrial restrictions for intrinsically-safe and explosion-proof operation in hazardous environments well known to those in the art. The sensor housing 22 is manufactured from aluminum or any other suitable non-magnetic material and is adapted to receive the sensor assembly 11.

Figure 3A:
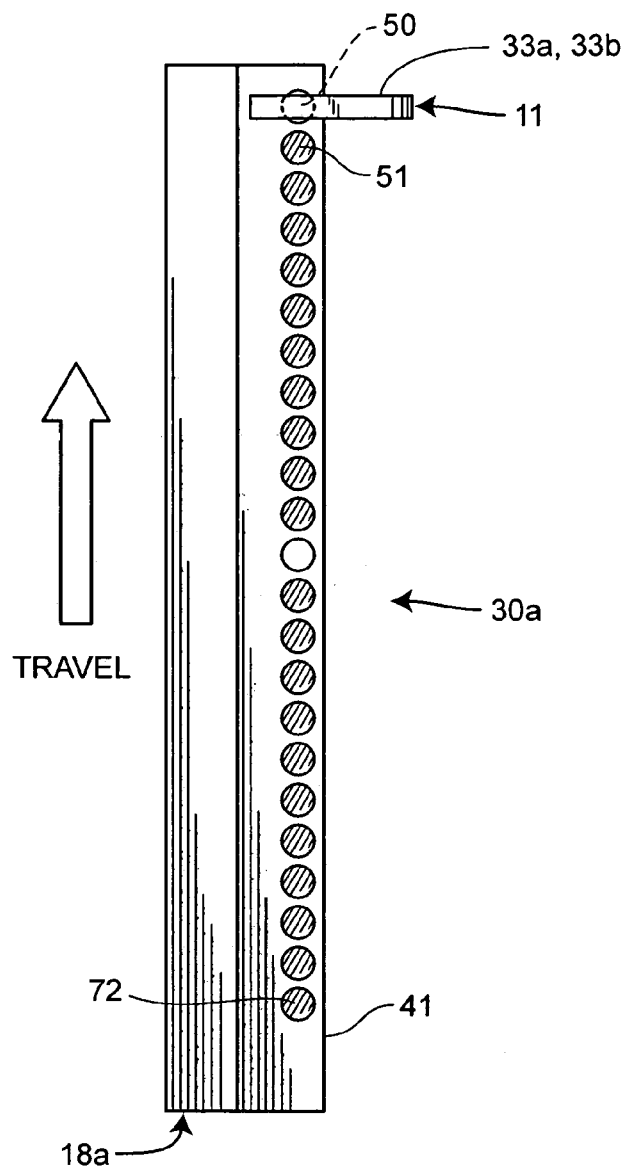
FIG. 3A is a side view of the position sensor showing a magnet flux source containing a plurality of discrete magnets having individual induction values positioned for rectilinear travel.
Figure 3B:
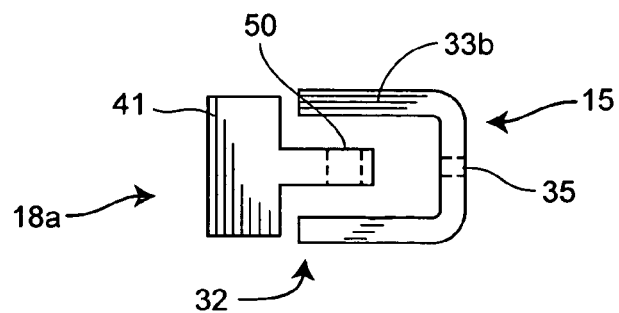
FIG. 3B is a top view of the position sensor of FIG. 3A for rectilinear travel and shows the lateral position and the insertion depth of the magnetic flux source within the sensor assembly.

Referring now to FIG. 3A and FIG. 3B, the magnetic flux source 18a (FIG. 3A) and the sensor assembly 11 (FIG. 3B) in the preferred embodiment are discussed in detail. In the preferred embodiment, the magnetic flux source 18a is designed to measure rectilinear travel and provide a linear output signal over the entire range of displacement measurement. For example, a ten percent change in displacement will produce a corresponding ten percent change in the position sensor's output signal. All changes in position sensor output are in direct proportion to changes in displacement. The linear output relationship is important in the functioning of a remotely operated instrument. By creating a directly proportional measurement of displacement, no additional processing by the remotely operated instrument 19 or the sensor electronics 13 (FIGS. 3C and 3D) is required to provide position feedback.

A plurality of individual or discrete cylindrical magnets 50–72 is assembled in a rectangular-shaped carrier 41 to create the magnetic flux source 18a. The preferred material for the carrier 41 is nonmagnetic such as aluminum or plastic. In the preferred embodiment, twenty-three discrete magnets 50–72 are arranged in the carrier 41 to create a linear array capable of measuring about 4.5 inches of rectilinear travel. The discrete magnets 50–72 are preferably fabricated from ALNICO 8H and aligned vertically and horizontally. In one embodiment, the magnets 50–72 are mounted within the carrier using an epoxy such as 2214 Structural Adhesive from 3M of Saint Paul, Minn. Each discrete magnet 50–72 is approximately 0.1875 inches in diameter and 0.1875 inches in length. The center-to-center spacing of the individual magnets in the vertical direction is approximately 0.25 inches providing about 4.5 inches displacement measurement over the central portion of the array. The carrier 41 provides the mechanical alignment of the magnet array and attaches directly to the stem connector 27 with the mounting assembly 14 being attached to the stem connector 27 using stem connector bolts 16a and 16b as previously shown in FIG. 2A.

As understood by one skilled in the art, dimensional tolerance stack-up that occurs during mounting of the remotely mounted instrument 19 on the actuator 20 requires instrument calibration prior to operation of the valve assembly 23. Instrument calibration is facilitated by providing coarse positional alignment along the longitudinal axis of travel and in a plane horizontally perpendicular to the longitudinal axis. Unlike prior art linkages that directly couple motion to the sensor, the mounting plate 15a and alignment plate 15b of mounting assembly 14 are static and only provide adjustment during the installation process. The horizontal alignment of the magnetic flux source 18a and the sensor assembly 11 is further depicted in FIG. 3B.

The top view illustrated in FIG. 3B clearly shows the U-shaped flux-gathering pole piece 32 of the sensor assembly 11. The flux-gathering pole piece 32 is comprised of two L-shaped sections 33a and 33b of high permeability material, preferably annealed HyMu "80"® from Carpenter Technology of Reading, Pa., placed in mirrored opposition of each other. The L-shaped sections 33a and 33b are joined at the base with a gap adapted to receive the magnetic sensor 35 and place each L-shaped section 33a and 33b in intimate contact with the magnetic sensor 35. The square cross-sectional dimension of each L-shaped section 33a and 33b is approximately 0.15 inches. Preferably, each L-shape section 33a and 33b is approximately 1.25 inches in depth and 0.445 inches across the base leg thus creating a U-shape that has external dimensions of approximately 1.25 inches in depth by 0.89 inches in width. In the preferred embodiment, the magnetic sensor 35 is an Allegro 3516 Hall Effect element, but other types of magnetic sensors could be used as well or in addition.

Figure 3C:
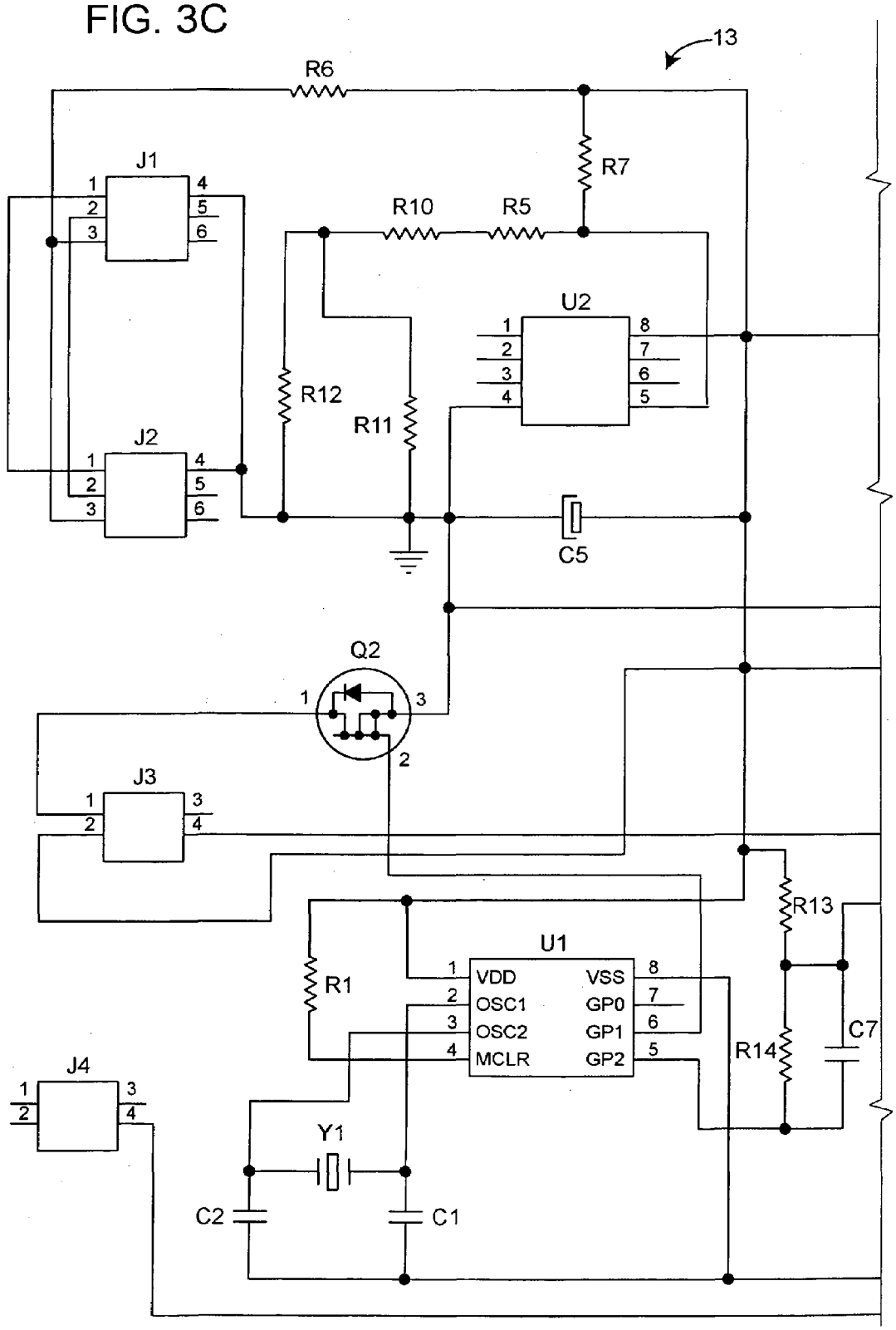
FIGS. 3C and 3D are, combined, a schematic illustrating an electronic circuit that is used to intermittently power the magnetic sensor and condition the pulsed output signal to create an analog signal for use in a remotely operated instrument.
Figure 3D:
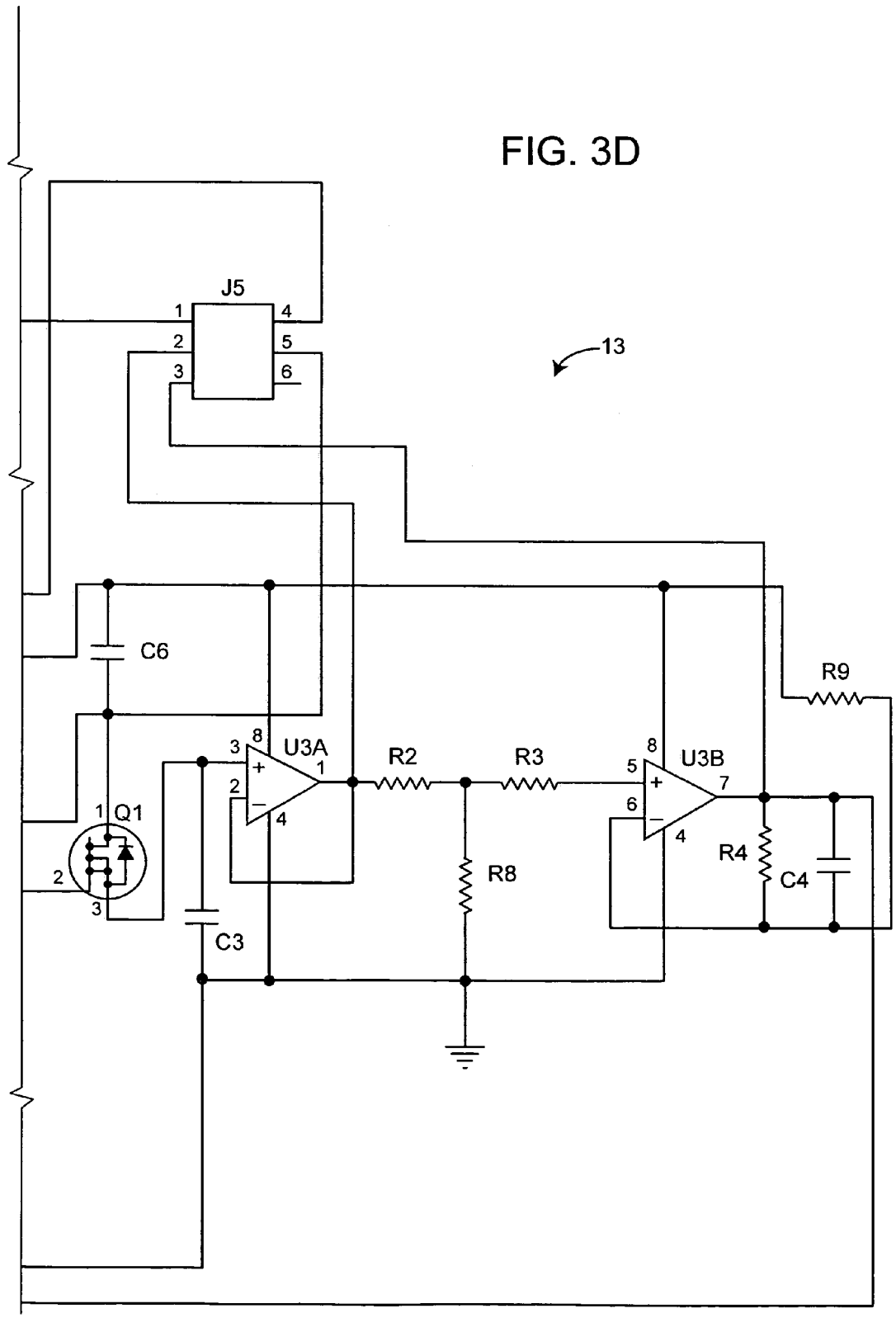

The output of magnetic sensor 35 is processed by the electronic circuit 13 (FIGS. 3C and 3D). The electronic circuit 13 provides the interface between the magnetic sensor 35 and the remotely operated instrument 19. As illustrated in FIG. 3C, a pair of connectors J1 and J2 receive power from an industrial standard 4–20 mA current loop. As understood by those skilled in the art, power for the magnetic sensor 35 and the electronic circuit 13 may be generated from a regulator circuit designed with the LM285 micropower voltage reference diode U2 from National Semiconductor of Santa Clara, Calif. and passive components R5, R6, R7, R10, R11, R12, and C5. The values/designations for these and other components of FIGS. 3C and 3D are illustrated in Table 1.

Powering the circuits intermittently reduces the power consumption of the magnetic sensor 35 and the electronic circuit 13. The magnetic sensor 35 is connected to the electronic circuit through connector J3 and is "power switched" or pulsed at approximately 200 Hertz through an N-channel Field-Effect Transistor (FET) Q2. As understood by those skilled in the art, the embedded controller U1, a PIC12C508A available from Microchip Technology of Phoenix, Ariz. and passive components R1, Y1, C1 and C2 provide the timing and control for pulsed operation. The pulsed output signal from the magnetic sensor 35 must be interpolated or reconstructed to create an analog signal that can be processed by the remotely operated instrument 19. The FET Q1, an operational amplifier U3A (FIG. 3O), and passive components R2, R8, R13, R14, C3, C6, and C7, create a sample and hold circuit to reconstruct the analog signal. An operational amplifier U3B and passive components R3, R4, R9, and C4 condition (i.e. adjust the gain and offset) and filter the reconstructed analog signal to create the final output signal. The final output signal or position displacement measurement is transmitted to the remotely operated instrument 19 through connector J4 (FIG. 3C). Finally, the test connector J5 can provide test signals for diagnostic evaluation for the magnetic sensor 35 and the electronic circuit 13.

TABLE 1

| Component | Value/Designation |
|---|---|
| R1 | 100 KΩ |
| R2 | 634 KΩ |
| R3 | 178 KΩ |
| R4 | 86.6 KΩ |
| R5 | 665 KΩ |
| R6 | 24.3 KΩ |
| R7 | 51 KΩ |
| R8 | 221 KΩ |
| R9 | 1 MΩ |
| R10 | 665 KΩ |
| R11 | 15 KΩ |
| R12 | 60.4 KΩ |
| R13 | 2 MΩ |
| R14 | 1 MΩ |
| C1 | 5.1 pFd |
| C2 | 5.1 pFd |
| C3 | 0.47 µFd |
| C4 | 18 pFd |
| C5 | 47 µFd |
| U1 | PIC12C508A |
| U2 | LM285BYM |
| U3 | OP281 |
| Y1 | 131 KHz |
| Q1 | BSS138 |
| Q2 | BSS138 |
| J1 | CONN0611 |
| J2 | CONN0611 |
| J3 | CONN0411 |
| J4 | CONN0411 |
| J5 | CONN0611 |

Continuing to FIG. 4B, the flux-gathering pole piece 32 collects the magnetic field 10 from the magnetic flux source 18a and directs the flux to the magnetic sensor 35 and is discussed in more detail below. The magnetic flux source 18a is mounted approximately perpendicular to sensor assembly 11 such that any relative horizontal displacement does not cause physical contact of the magnetic flux source 18a with the inner legs on the flux-gathering pole piece 32. The magnetic flux source 18a is engaged about 0.3125 inches past the opening of the U-shaped, flux-gathering pole piece 32. An air gap approximately 0.2 inches on each side of the magnetic flux source 18a symmetrically positions the magnetic flux source 18a within the sensor assembly 11.

Each discrete magnet 50–72 produces a magnetic field. As is known, the shape and density of the magnetic field is directly related to several factors. Two of those factors are the induction of the magnet and the magnet's interactions with extraneous magnetic fields. To better understand the unique characteristics of the magnetic flux source 18a, the aforementioned factors are explained in greater detail below.

The induction of the magnet is a direct measure of its inherent magnetic strength and can be controlled or programmed during manufacture. As known, for a given physical geometry of the magnet, an increase in its induction produces a corresponding increase in the strength of the magnet and the density of its magnetic field. By controlling the discrete magnets' induction, its flux density (i.e. the amount of flux in a given volume) and therefore its magnetic field, can be controlled. Also, any additional or extraneous magnetic field not generated by the discrete magnet can be combined with the magnetic field generated by the discrete magnet. The polarity and density of the additional magnetic field can "additively" increase or decrease the magnetic field that surrounds the discrete magnet. The magnetic circuit described herein utilizes both the induction control and the interactions between extraneous magnetic fields to create a programmable magnetic flux source.

Single bar magnets, as demonstrated in prior art, present difficulties when using the entire length of the magnet for displacement measurement. As illustrated in FIG. 4A, the polarization direction or orientation of the magnetic poles in the single bar magnet application is parallel to the direction of travel. This polar orientation establishes highly concentrated magnetic fields 130a and 130b near the poles of the magnet. In these dense flux regions, the repelling forces between the lines of flux create extremely nonlinear changes in the magnetic field. If a single bar magnet is to be used for displacement measurement, special processing by the sensor assembly electronics is required to create a linear output. Alternatively, the length of the magnet could be increased by approximately 75% to negate the nonlinear end effects, but this approach needlessly increases cost and limits position sensor application due to the increase in physical length. In the preferred embodiment, the magnet flux source length can be substantially equal to the maximum displacement to be detected and no special processing of the output signal is required.

FIG. 4B is a free space diagram of a preferred embodiment using only seven discrete magnets 50–56 to graphically illustrate the magnetic fields 110–116 that combine to create the larger compound magnetic field 10. The following magnetic theory appropriately explains the relationship between the plurality of discrete magnets. As shown FIG. 4B, the individual magnetic fields 110–116 not only envelop the discrete magnets 50–56 from which they originate, but also provide intersecting flux lines for adjacent magnets. The overlapped flux regions additively combine to produce a larger predefined magnetic field 10 that defines the entire magnetic flux source. In a preferred embodiment, the polar axis of each discrete magnet 50–56 is oriented perpendicular to the direction of relative motion to facilitate "stacking" the sequential magnetic fields. By controlling the induction or strength of each discrete magnet 50–56 and placing them in a linear array, the discrete magnetic fields 110–116 additively combine to produce a programmable magnetic flux source that yields a predefined magnetic field 10.

As previously stated, each discrete magnet has a specific amount of magnetic "energy" or induction associated with it.

Physical magnetic volume, magnet geometry, and magnet material characteristics all dictate how much magnetic energy can reside within the magnet. As known to those skilled in the art, each discrete magnet's induction can be programmed or calibrated using a conventional magnet treater such as the Model 990C Magnetreater® made by Magnetic Instrumentation, Inc. of Indianapolis, Ind. All of the aforementioned magnet characteristics are considered when using the Model 990C Magnetreater®. Table 2, shown below, provides the values of induction for the linear array depicted in FIG. 3A.

TABLE 2

| Magnet Number | Target (Gauss) |
| --- | --- |
| 50 | 465.6 |
| 51 | 465.6 |
| 52 | 344.5 |
| 53 | 288.7 |
| 54 | 258.4 |
| 55 | 218.8 |
| 56 | 186.2 |
| 57 | 142.0 |
| 58 | 121.1 |
| 59 | 76.8 |
| 60 | 46.6 |
| 61 | 0 |
| 62 | −46.6 |
| 63 | −76.8 |
| 64 | −121.1 |
| 65 | −142.0 |
| 66 | −186.2 |
| 67 | −218.8 |
| 68 | −258.4 |
| 69 | −288.7 |
| 70 | −344.5 |
| 71 | −465.6 |
| 72 | −465.6 |

As previously stated and shown in Table 2 the induction values of sequential magnets vary in graduated amounts to create the magnetic field 10 of magnetic flux source 18a. A discrete magnet 61 is located in the geometric center of the array and is programmed to zero gauss to provide a magnetic null for absolute reference during instrument calibration. Further, to provide absolute displacement measurement, the discrete magnets 50–72 are of opposite polarity on each side of the magnetic null. This polarity difference is detected by the electronic circuit 13 (not shown in FIG. 4B) and is used by the remotely operated instrument 19 as an absolute position measurement. As known, the opposite arithmetic sign in the values of Table 2 denotes the polarity change. Conventionally, positive values are assigned to relative displacements above the magnetic null and negative values are assigned to relative displacements below the magnetic null. Although the preferred embodiment teaches a position sensor with a linear output relationship, it should be appreciated that the inherent programmability of the magnetic flux source can provide numerous position-sensor output signal travel relationships without modifying the sensor assembly electronics. The unique characteristics of the discretized magnetic flux source provide efficient adaptation to various forms of displacement measurement as well. The adaptations are explained in greater detail in the alternate embodiments described below.

In another embodiment of the rectilinear application, repositioning the discrete magnets within the magnetic flux source controls the interactions. As previously mentioned, the preferred embodiment relies upon programming the induction of adjacent discrete magnets to create a predefined output signal. Referring back to FIGS. 1A–1D, physical position within the magnetic field determines the measured strength of that field. Similarly, by creating space or distance between the adjacent magnets, the apparent strength of the discrete magnets, and therefore their interactions, can be controlled.

Figure 5A:
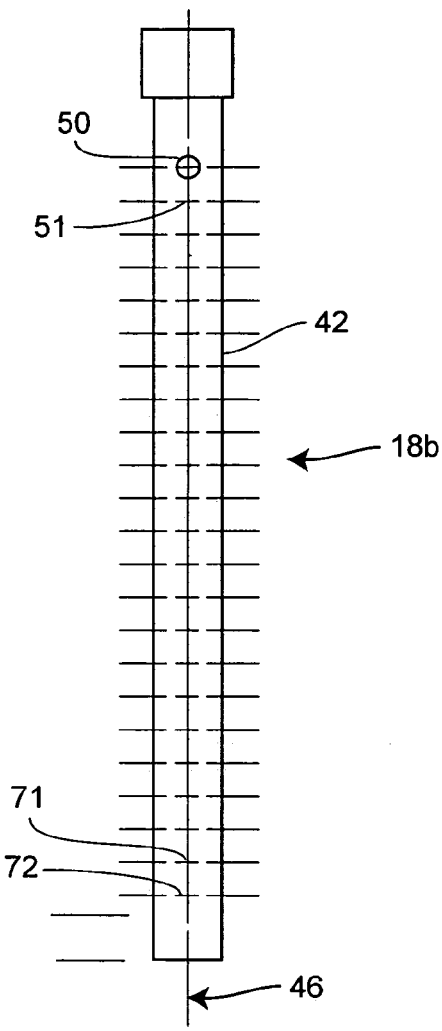
FIG. 5A is an illustrative side view of a cylindrical magnet carrier labeled to show equidistant vertical spacing of helically oriented discrete magnets in the magnetic flux source for a 4.5 inch rectilinear travel position sensor.

FIG. 5A is a side view of an alternate embodiment. The discrete magnets 50–72 of magnetic flux source 18b are again spaced equidistantly along the longitudinal axis 46 of the carrier 42. Discrete magnets 50–72 are approximately 0.125 inches in diameter and 0.462 inches in length. The carrier 42 is adapted to receive the discrete magnets 50–72 with a center-to-center spacing of approximately 0.25 inches. The magnetic field interactions are controlled by helically orienting or rotating the discrete magnets 50–72 about the longitudinal axis 46 of the magnetic flux source 18b. As known, by increasing space away from a magnet in any direction, the apparent strength of the magnet will decrease. In this alternate embodiment, providing precise angular displacement between the adjacent magnets about the longitudinal axis controls the interactions between adjacent magnetic fields. In this alternate embodiment, the sensor assembly 11 (not shown) is the same as explained in detail in the preferred embodiment. Thus, through calculated placement of discrete magnets 50–72, a predefined output signal can be generated.

Figure 5B:
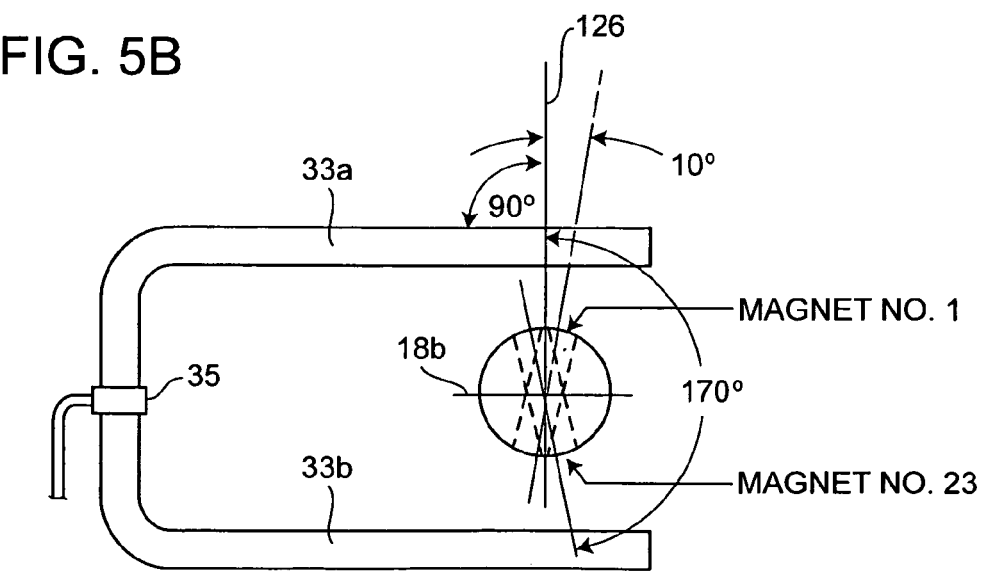
FIG. 5B is an illustrative top view of the helically oriented discrete magnet array for a rectilinear position sensor that shows the angular rotation of the discrete magnets within the magnetic flux source and the lateral position and the insertion depth of the magnetic flux source within the sensor assembly.

FIG. 5B is a top view of the helically oriented magnetic flux source 18b for a rectilinear position sensor. The illustration shows the rotation reference plane 126 for the discrete magnets 50–72. The magnetic flux source 18b is approximately centered between the first and second L-shaped sections 33a and 33b of the flux-gathering pole piece 32. Table 3, shown below, provides an example of the rotational angles required to achieve a substantially linear output from the sensor assembly 11 (not shown) with all the discrete magnets 50–72 programmed to approximately 457 Gauss.

TABLE 3

| Magnet Number | Rotation Angle (degrees) |
| --- | --- |
| 50 | 10 |
| 51 | 43 |
| 52 | 70 |
| 53 | 71 |
| 54 | 71 |
| 55 | 74.5 |
| 56 | 79 |
| 57 | 80 |
| 58 | 82 |
| 59 | 85 |
| 60 | 89 |
| 61 | 90 |
| 62 | 91 |
| 63 | 95 |
| 64 | 98 |
| 65 | 100 |
| 66 | 101 |
| 67 | 106 |
| 68 | 109 |
| 69 | 109 |
| 70 | 110 |
| 71 | 137 |
| 72 | 170 |

Figure 6:
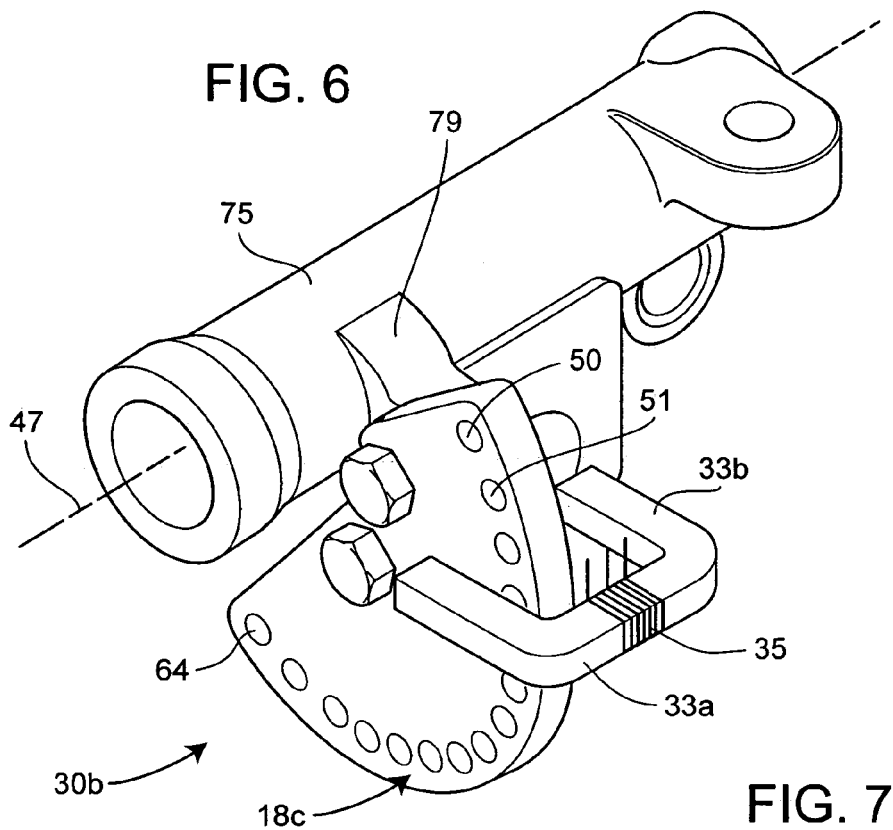
FIG. 6 is an illustrative perspective view of a rotary position sensor coupled to a rotary shaft where the plurality of discrete magnets comprising the rotary magnetic flux source are positioned with uniform angular distribution about the axis of rotation.

Another embodiment of the position sensor is shown in FIG. 6. A rotary non-contact position sensor 30b is constructed using similar techniques described in the preferred embodiment. Fifteen discrete magnets 50–64 are aligned in a sector-shaped carrier 43 with a uniform angular distribution of six degrees. The sector-shaped carrier is mounted perpendicular to the axis of rotation 47 to create the rotary magnetic flux source 18c. Again, the sector-shaped carrier 43 is preferably made from aluminum. The rotary magnetic flux source 18c is directly coupled to a rotary shaft 75 by a rotary mounting assembly 79. The L-shaped sections 33a and 33b of the flux-gathering pole piece, the magnetic sensor 35, and discrete magnets 50–64 are the same as explained above. Table 4, shown below, provides the values of induction for the rotary magnetic flux source 18c depicted in FIG. 6.

TABLE 4

| Magnet Number | Target (Gauss) |
| --- | --- |
| 50 | 465.6 |
| 51 | 226.3 |
| 52 | 179.3 |
| 53 | 155.0 |
| 54 | 110.3 |
| 55 | 82.9 |
| 56 | 38.6 |
| 57 | 0.0 |
| 58 | −38.6 |
| 59 | −82.9 |
| 60 | −110.3 |
| 61 | −155.0 |
| 62 | −179.3 |
| 63 | −226.3 |
| 64 | −465.6 |

The rotary position sensor 30b shown in FIG. 6 provides a linear relationship between rotary travel and sensor output through controlled calibration of the induction of each discrete magnet 50–64. The linear output operating characteristics are provided through 90 degrees of rotation.

Figure 7A:
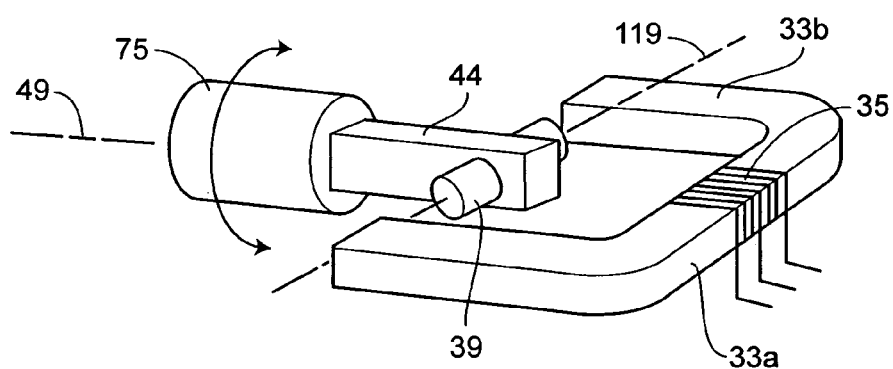
FIG. 7A is an illustrative perspective view of an end-mounted rotary position sensor where the cylindrical magnetic flux source is rotated between legs of the flux-gathering pole piece.

The principles described herein may also be applied to a rotational position sensor 30c with an extended linear operating range. Using the same L-shaped sections 33a and 33b of the flux-gathering pole piece 32 and the magnetic sensor as described above with reference to FIG. 2C, a single cylindrical bar magnet 39 can be used as the magnetic flux source for the position sensor. As shown in FIG. 7A, the rotary sensor 30c is designed to provide an output that varies in a linear manner. The cylindrical magnet 39 is rotated between the first and second L-shaped sections 33a and 33b of the flux-gathering pole piece 32 to provide a substantially linear output signal. Maximum linearity is achieved through proper selection of magnet length. With respect to the flux-gathering pole piece 32, the optimal length for the cylindrical magnet 39 is essentially two-thirds the width of the gap between the L-shaped sections of the flux-gathering pole piece 32. For example, using the flux-gathering pole piece 32 of the preferred embodiment with an internal width of approximately 0.59 inches, the cylindrical magnet 39 will have a length of approximately 0.385 inches. In this alternate embodiment, the diameter of the cylindrical magnet 39 is approximately 0.1875 inches. As shown, the carrier 44 attaches the cylindrical magnet 39 to the rotating shaft 75. The carrier 44 is adapted to attach to the cylindrical magnet 39 about axis 49 of the rotating shaft 75. Furthermore, the cylindrical magnet 39 is inserted about 0.3125 inches past the opening of the flux-gathering pole piece 32.

Figure 7B:
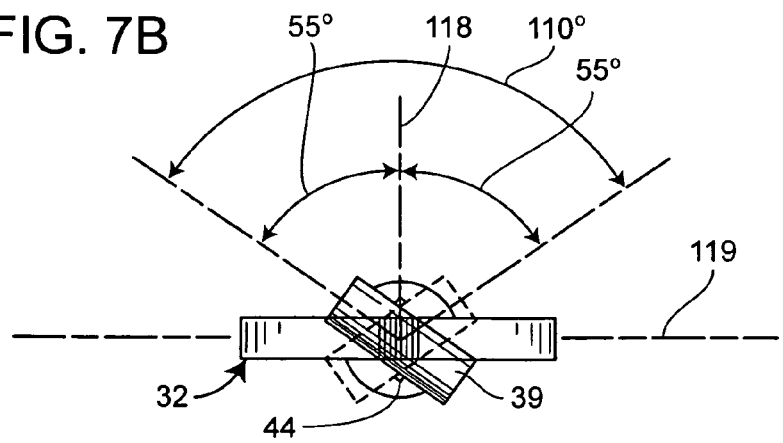
FIG. 7B is an illustrative end view showing the reference sensing plane and the maximum angular rotation for the end-mounted rotary position sensor exhibiting linear output characteristics.

As shown in FIG. 7B, the linear output operating characteristics are provided through 110 degrees of rotation whereby the rotation is symmetrically distributed about a plane 119 bisecting the first and second L-shaped sections 33a and 33b of the flux-gathering pole piece 32. The bisecting plane 119 is oriented at a right angle to the sensing plane 118 of the magnetic sensor.

Many modifications and variations may be made in the techniques and structures described and illustrated herein without departing from the spirit and scope of the present invention. For example, a magnetic shunt constructed of ferromagnetic material could be placed adjacent to or completely surrounding each discrete magnet to selectively reduce its magnetic field and therefore control its effect on subsequent magnets. Additionally, non-uniform spacing between individual magnets or variable magnet length could also be used. Accordingly, it should be understood that the methods and apparatus described herein are illustrative only and are not limiting upon the scope of the present invention.

We claim:

1. A position sensor, wherein the position sensor comprises:
    a sensor, the sensor including an electronic device being responsive to magnetic fields and a flux-gathering pole piece for collecting and directing magnetic flux to the sensor, the flux-gathering pole piece being constructed by the symmetric placement of a first and a second L-shaped section of magnetically permeable material forming a U-shape with a bifurcated base, the bifurcated base of the U-shaped pole piece having a gap separating the first and second L-shaped sections wherein the gap is sized to provide intimate contact with the electronic device, and
    a magnetic flux source for generating a magnetic field that varies in a substantially linear manner, the magnetic flux source being cylindrically shaped and having a length essentially two-thirds of the internal width of the flux-gathering pole piece such that when rotated between the first and second L-shaped sections of the flux-gathering pole piece the magnetic flux source generates a signal representative of the displacement between the sensor and the magnetic flux source.

2. The apparatus of claim 1, wherein the magnetic flux source is comprised of a single bar magnet.

3. The apparatus of claim 1, wherein the magnetic flux source is comprised of a plurality of discrete magnets placed in intimate contact with polar attraction.

4. The apparatus of claim 1, wherein the representative signal is produced through about 110 degrees of rotation, the rotation being symmetrically distributed about a plane bisecting the first and second L-shaped sections of the flux-gathering pole piece, the bisecting plane being orthogonal to the sensing plane of the magnetic sensor.

* * * * *

UNITED STATES PATENT AND TRADEMARK OFFICE
CERTIFICATE OF CORRECTION

PATENT NO. : 7,005,847 B2 Page 1 of 1
APPLICATION NO. : 11/153937
DATED : February 28, 2006
INVENTOR(S) : George W. Gassman et al.

It is certified that error appears in the above-identified patent and that said Letters Patent is hereby corrected as shown below:

On Title Page
Item (75) Inventors:

Line 1   Please delete "Marion" and replace with -- Marshalltown --.

On Title Page
Item (73) Assignee:

Line 2   Please delete "MI" and replace with -- MO --.

Column 1, line 55   Applicants' error, "operate" should be -- operated --.
Column 2, line 30   Applicants' error, "sensor" should be -- sensors --.
Column 8, line 16   Applicants' error, "magnets' " should be -- magnet's --.
Column 9, line 56   "position-sensor" should be -- position sensor --.

Signed and Sealed this

Sixteenth Day of January, 2007

JON W. DUDAS
*Director of the United States Patent and Trademark Office*